United States Patent [19]

Carlstrom

[11] Patent Number: 4,663,108
[45] Date of Patent: May 5, 1987

[54] VACUUM LINER FOR A PLASMA DEVICE

[75] Inventor: Thomas N. Carlstrom, Poway, Calif.

[73] Assignee: GA Technologies, Inc., San Diego, Calif.

[21] Appl. No.: 664,681

[22] Filed: Oct. 25, 1984

[51] Int. Cl.[4] ............................................. G21B 1/00
[52] U.S. Cl. .................................................. 376/136
[58] Field of Search ........................................ 376/136

[56] References Cited

U.S. PATENT DOCUMENTS 3,109,801  11/1963  Thonemann .................... 204/193.2
4,414,176  11/1983  Krauss et al. ...................... 376/136

OTHER PUBLICATIONS

Abstracts from Bulletin of the American Physical Society, vol. 27, p. 1108, 1982; and vol. 28, p. 1097, 1983.

Primary Examiner—John F. Terapane
Assistant Examiner—Eric Jorgensen
Attorney, Agent, or Firm—Fitch, Even, Tabin & Flannery

[57] ABSTRACT

A vacuum liner for containing plasma in a plasma device. The liner includes a vacuum tight liner wall formed by sections with each section having a closed peripheral wall defining an interior with open ends. Adjacent interiors of the adjacent section form a plasma path. Some of the sections are bellows-shaped having a plurality of corrugations extending transversely to the axis of the plasma path. The liner also includes means for keeping the plasma from the liner wall. The limiter means includes a ring formed by beads nested in the interior grooves formed by each of the corrugations, with at least some of the beads extending from their grooves past the interior ridges flanking them. The material from which the beads are formed has a higher melting temperature than that of the material in which the sections are formed.

13 Claims, 14 Drawing Figures

VACUUM LINER FOR A PLASMA DEVICE

The present invention relates to a vacuum liner for a plasma device and, more specifically, to such a liner which includes limiters for limiting the plasma from contacting a vacuum tight liner wall formed, in part, by bellows sections.

BACKGROUND OF THE INVENTION

Vacuum liners for defining a plasma path have been constructed using thin wall bellows sections made of stainless steel. These bellows sections offer high strength while forming a closed loop having sufficiently high electrical resistance that penetration times are acceptably low for magnetic fields generated by poloidal, toroidal or other associated magnetic systems for containing and energizing the plasma. Unfortunately, the thin bellows sections, when used in a high energy plasma environment may experience local surface melting due to plasma contact. The melting results in structural weakness and vacuum leaks in the liner.

In one attempt to prevent melting of the bellows sections, short pieces of stainless steel rod limiters were installed on the inside surface of the sections. By absorbing the plasma energy, the rods protect the bellows. However, contact with the plasma causes erosion of the metal rods, resulting in contamination of the plasma due to the introduction of metal impurities which radiate and cause loss of power in the plasma. For further information regarding the structure and operation of such limiters, reference may be made to "Experimental and Computational Studies of Reversed-Field Pinch on TPE-IR(M)", by Ogawa et al. in "Proceedings of the 9th International Conference on Plasma Physics and Controlled Nuclear Fusion Research", Baltimore, 1982 (IAEA, Vienna, 1983), Vol. I, p. 575. Metallic limiters are also shown in U.S. Pat. No. 4,073,680.

In order to avoid the introduction of metal impurities into the plasma, carbon tiles have been used instead of the metal rods. However, the discrete tiles are not readily reliably fastened to the interior of the bellows. In another attempt to protect the bellows and avoid contamination of the plasma, rings of carbon tiles were placed at spaced locations in the vacuum chamber in the effort to make the plasma only contact the tiles. However, the expected reduction of the heat level on the bellows was not found, and arcing occurred between the liner and the tiles which resulted in damage to the liner. For further information regarding such limiters, reference may be-made to "Mushroom Limiter Studies in ZT-40M", Downing et al., Bull. Am. Phy. Soc., 27, 1108 (1982); and "Temperature and Resistivity of the ZT-40M RFP with Poloidal Limiters", Haberstich et al., Bull. Am. Phy., 28, 1097.

SUMMARY OF THE INVENTION

Among the several aspects of the present invention may be noted the provision of an improved vacuum liner for a high energy plasma device. The liner is formed by a wall made up of a number of bellows sections, and limiters are provided to protect these sections from contact with the plasma. Limiter rings made of carbon beads, which may be right circular cylinders, are positioned in each interior groove of the sections, and the beads in each ring push against one another so that the entire ring is in compression. Because the flanking internal ridges formed by the corrugations of the bellows sections prevent lateral movement of the beads and the material defining the groove precludes substantial expansion of the loop formed by the ring, the ring is firmly retained in its groove. Certain beads may have an insert portion for reception in the groove and an arm extending over a ridge and overlapping a neighboring bead to further protect the ridge. Additionally, the beads, which have apertures, can be formed into the rings by lacing a wire through the apertures with the end portions of the wire being overlapped inside the beads, thereby simplifying installation of the rings. Other objects and features of the present invention will be, in part, apparent and, in part, pointed out hereinafter in the following specification and in the accompanying claims and drawings.

Briefly, the vacuum liner of the present invention includes a vacuum tight liner wall formed by a series of sections with each section having an open ended wall closed peripherally to define an interior. Adjacent interiors of adjacent sections form a plasma path. Some of the sections are bellows-shaped, having a plurality of corrugations extending transversely to the axis of the plasma path. The liner also includes limiter rings formed by beads nested in the interior groove of each of the corrugations, with at least some of the beads extending from their grooves past the interior ridges flanking them. The material from which the beads are formed has a higher melting temperature than that of the material from which the sections are formed.

BRIEF DESCRIPTION OF THE DRAWINGS

Corresponding reference characters indicate corresponding components throughout the several views of the drawings.

DESCRIPTION OF THE PREFERRED EMBODIMENTS

Figure 1:
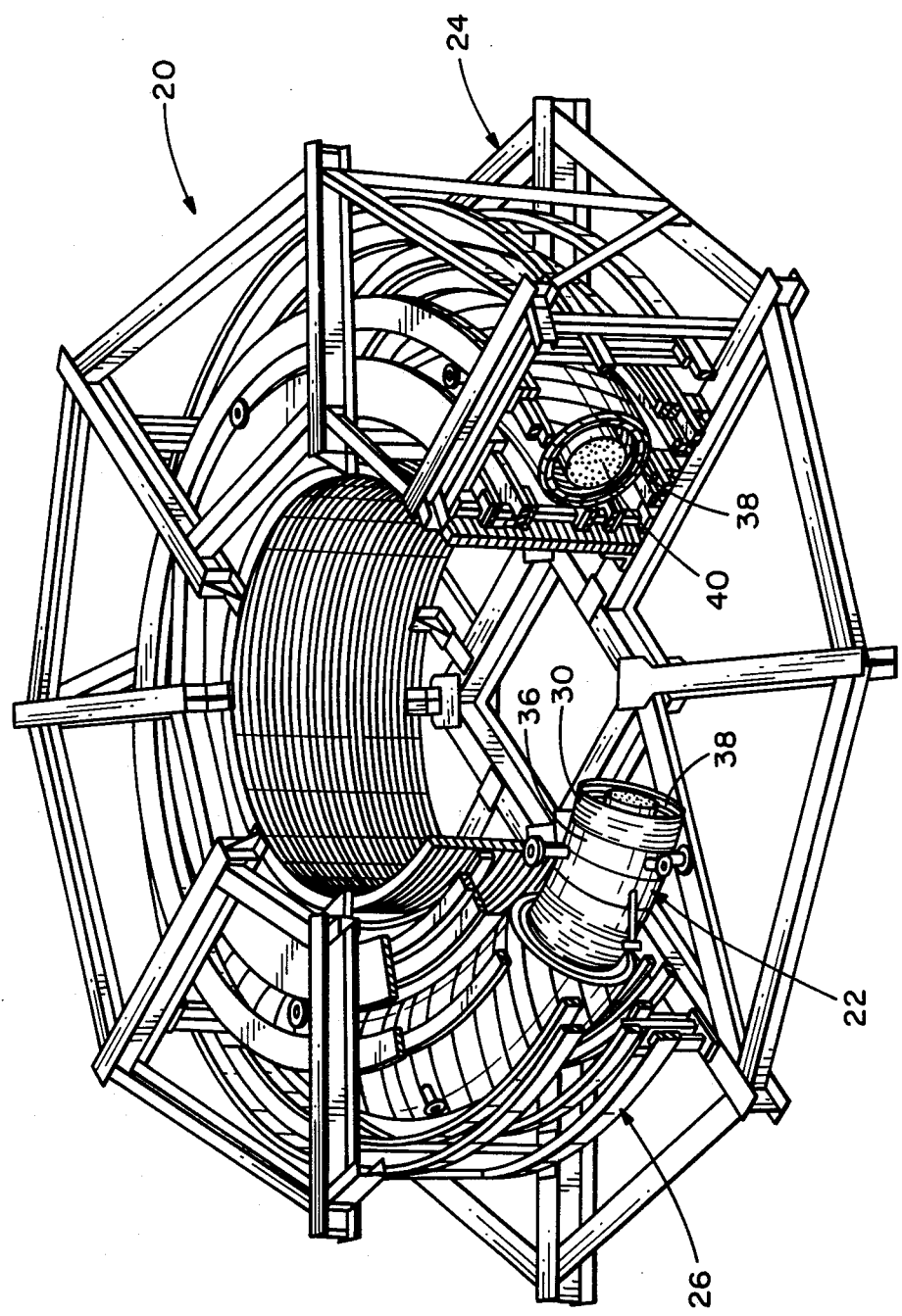
FIG. 1 is an isometric projection of a plasma device including a vacuum liner of the present invention, with certain components broken away to expose other components.
Figure 2:
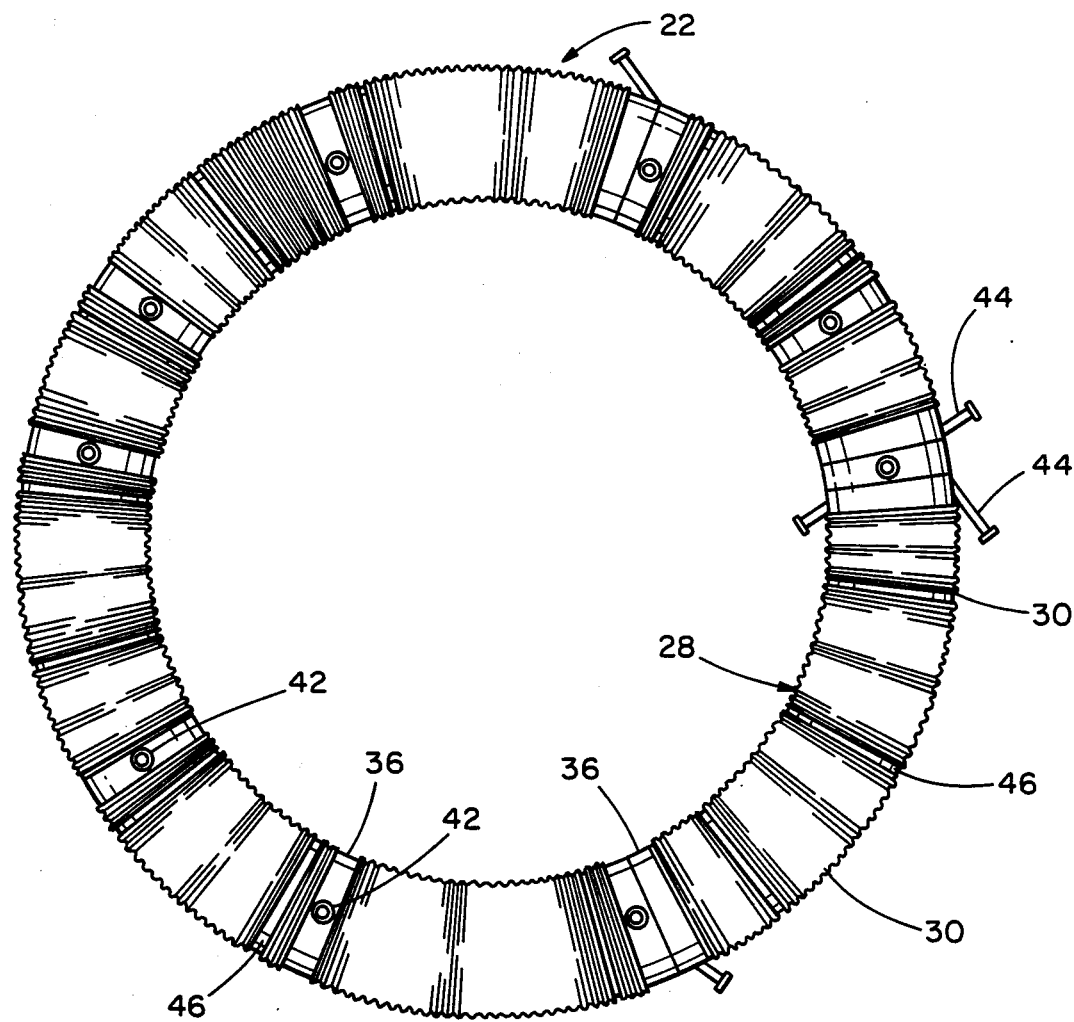
FIG. 2 is a plan view of the vacuum liner of FIG. 1 which is formed by bellows sections and port sections.

Referring now to the drawings, a vacuum liner for a high energy plasma device 20 (FIG. 1), is best shown in FIG. 2 at reference numeral 22. While the liner 22 is exemplarily shown as a torus, it will be appreciated that it can be formed into any desired shape. The device includes a frame 24 for supporting the liner and a magnet system 26 which could be made up of toroidal, poloidal, helical and other coils or windings which may be either of superconductive or normal material. The purposes of the magnetic system are to produce and confine the plasma inside the vacuum liner 22.

The liner 22 includes a vacuum tight liner wall 28 made up of a number of bellows sections 30 having corrugations forming interior ridges 32 and grooves 34 (see FIG. 3), and a number of port or gore sections 36 having generally smooth interiors. Each section has a closed peripheral wall defining an interior 38 with open ends. Adjacent interiors of adjacent sections form a plasma path 40. The corrugations of the bellows sections extend transversely to the axis of the plasma path. The bellows sections are preferably formed of stainless steel and have a relatively thin wall thickness, e.g., 20 mils. They have sufficient loop resistance that the penetration times for the magnetic fields provided by the magnet system, are acceptably short. The port sections, also made of stainless steel, are preferably somewhat thicker and have ports 42 and associated piping 44 for passage of the constituents of the plasma and for applying a vacuum. The various sections carry mating collars 46 at their ends so that the sections can be welded together to complete the vacuum tight wall 28.

Theoretically, a properly designed magnet system would provide sufficiently homogeneous magnetic fields that the plasma is contained in the liner out of contact with the liner inner surface. However, available magnet systems do not provide such ideal fields and the plasma contacts the liner inner surface. When the plasma contacts the inner surface of a bellows, energetic particles from the plasma impinge on the bellows wall resulting in localized heating and causing melting and loss of vacuum integrity. Additionally metal ions from the sections enter and contaminate the plasma. These metal ions might have a charge of 10, whereas the electrons and hydrogen ions typically found in the plasma have a charge of 1. The introduction of the metal ions into the plasma causes increased radiation resulting in power loss in the plasma.

Figure 3:
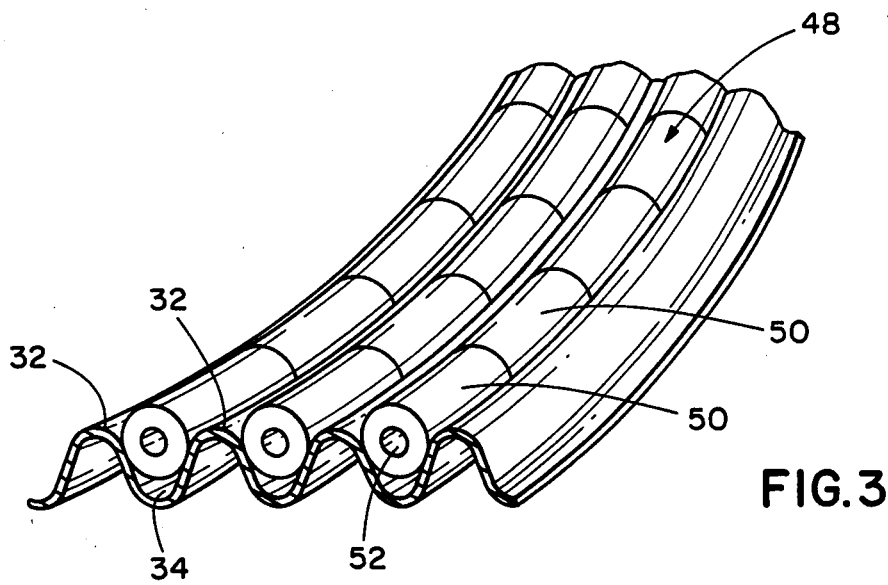
FIG. 3 is an isometric projection showing a portion of the interior of a bellows section with plasma limiter rings formed by beads nested in the interior grooves formed by the corrugations of the bellows section.
Figure 4:
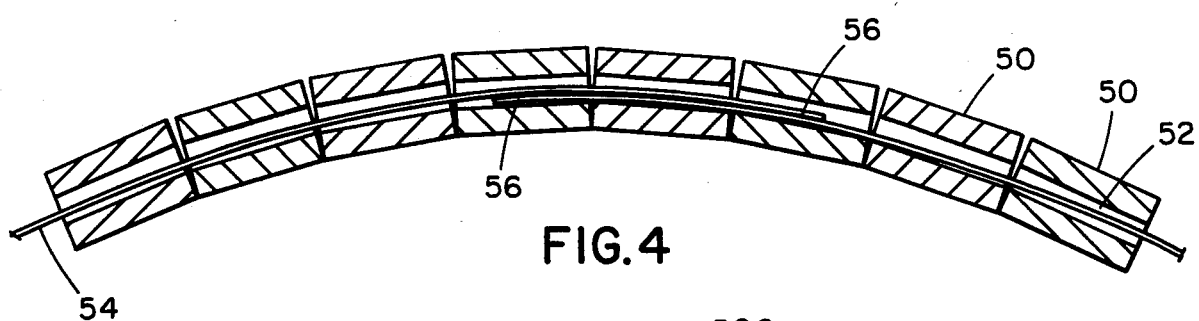
FIG. 4 illustrates a portion of a ring which includes a series of beads having apertures therethrough and a wire passing through the apertures to retain the beads.

In order to protect the bellows sections from the plasma, the vacuum liner of the present invention includes means for keeping the plasma from contacting the liner wall 28. This limiting means comprises a ring 48 made up of beads 50 nested in the interior groove 34 formed by each corrugation, as best shown in FIG. 3. The beads 50, which could be shaped as small right circular cylinders, each have an aperture 52 therethrough. A fastening means in the form of a wire 54 made of a material having resistance to high temperature and appropriate spring characteristics, such as a nickel-chromium-iron alloy, is laced through the beads, as shown in FIG. 4. The ends 56 of the wire are overlapped inside beads of the ring. The beads are formed of a material having a higher melting temperature than the material from which the liner wall 28 is formed. The beads are preferably formed of silicon carbide coated carbon, ceramic material or a nickel-chromium-iron alloy, with high density carbon being most preferable.

The liner wall 28, with all its bellows sections 30, can include over 400 corrugations with each ring including 100 or more beads. Thus the installation of the rings must be simple to keep the cost low. The as-formed length of each ring is preferably slightly greater than the circumference of the groove portion to be filled. The ring can be fitted into the groove with an inwardly protruding remaining bulge of a few beads. By pressing the bulge outwardly into the groove, all the beads in the ring slightly compress and the bellows slightly stretches, allowing the bulged portion to snap into the groove. By the "keystone effect" the ring is firmly held in its groove. Each bead is in compression and the material forming the groove prevents expansion of the loop while the flanking ridges preclude lateral movement of the ring. Thus the ring is installed simply and quickly with strong mechanical retention, all without any need to weld or otherwise fasten the beads to the bellows section.

As shown in FIG. 3, the beads 50 extend from their respective grooves 34 past the apices of the interior ridges toward the plasma path. Although the rings of beads do not overlie the inner ridges of the bellows sections, under many operating conditions they substantially protect the ridges from impingement by high energy charged particles which leave the plasma and give up their energy to the first surface they strike. This is because these particles predominantly follow the direction of the composite magnetic field. Typically the radial component of the composite magnetic field is much smaller than the toroidal component. Thus the paths taken by most of the escaping charged particles intersect the bellows section wall at shallow angles. These angles are so shallow that most charged particles strike the portions of the beads disposed above the level of the ridges and not the ridges. Put another way, although the ridges are visible in plan, they are in the shadow of the beads in view of the direction of the plasma.

Figures 6A, 6B:
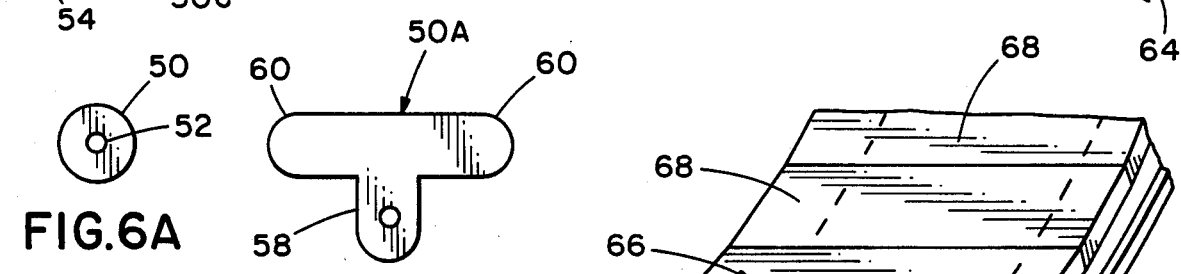
FIG. 6A–6C depict various cross-sectional shapes for the beads.
Figure 6C:
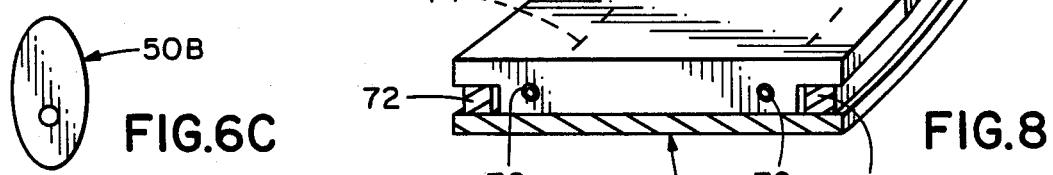

Besides the right circular cylindrical bead 50 of FIG. 6A, the beads could be made into other shapes. A T-shaped bead 50A includes a stem 58 for reception in the groove and oppositely extending arms 60 which at least partially overlie the ridges 32 flanking the groove 34 in which is disposed the stem 58. A bead 50B which is elliptical in cross section is shown in FIG. 6C. Because this bead configuration extends further toward the plasma path, it casts a longer shadow with respect to the escape trajectories of the charged particles. Thus, rings formed using the beads 50B could, under certain circumstances, be placed in every other groove with the remaining grooves left empty. The elliptical beads would then cast a shadow over all the ridges.

Figure 5:
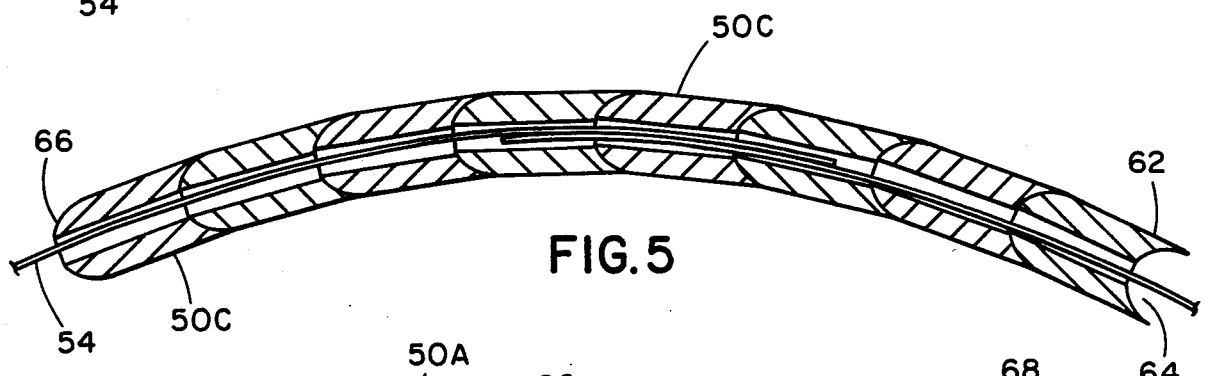
FIG. 5, similar to FIG. 4, illustrates retained beads having overlapped ends.

Referring to FIG. 5 a bead configuration is shown which protects portions of the wire extending between the beads. Each bead 50C has a tail portion 62 with a central recess 64, and a pointed nose portion 66 sized for reception in the recess 64 of the next bead. Accordingly wire portions between the beads are shadowed by components of the tail portions 62.

Figures 7, 8:
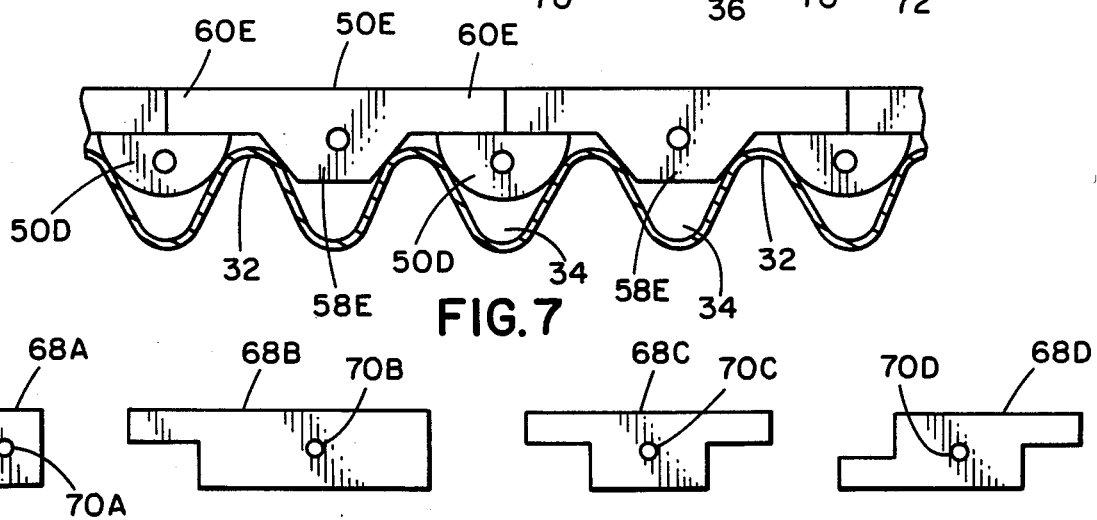
FIG. 7 is a sectional view of another ring arrangement wherein every other groove has a ring made of split cylinder beads with remaining grooves having T-shaped beads with arms overlapping the split cylinder beads to cover more fully the interior wall surface.
FIG. 8 is an isometric projection showing a portion of the interior of a port section with a plasma limiter ring formed by a plurality of elongate tiles shielding the interior surface of the port section.
Figures 9A, 9B, 9C, 9D:
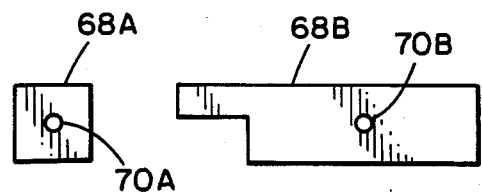
FIGS. 9A–9D show various shaped tiles for forming rings for fitting between a bellows section and a port section.

Referring to FIG. 7, bead configurations are shown which substantially fully cover the ridges with respect to the plasma. A ring formed of a first type of bead 50D is disposed in every other groove. The beads 50D are in the form of split or one half cylinders and are disposed so that the flat side of the bead faces the plasma path. The remaining grooves are fitted with rings formed of modified T-shaped beads 50E, each having a stem 58E and oppositely extending arms 60E of sufficient length and elevation to overlie the ridges flanking their groove and to overlap the beads 50D in adjacent grooves.

Although melting and consequential vacuum loss is usually not a problem with the thicker port sections 36, introduction of metal ions therefrom into the plasma can be a problem. Thus it is preferable to cover also the interiors of the port sections with a limiter ring 66 shown in FIG. 8. The limiter ring for the port sections includes a plurality of T-shaped tiles 68 with each tile having a pair of spaced apertures 70, one adjacent each side, for receiving wires to form the tiles 68 into the ring 66. Spaced annular end stops 72 are welded to the interior of the port sections to locate the ring 66. The limiter ring is installed in a manner similar to the installation of the ring 48 described above. Note that two wires 74 are used to hold the limiter ring. These wires are positioned to flank any ports 42 formed in the port section. Thus the wires are positioned to hold remaining tile portions even through a central portion of a tile is removed to accommodate the port.

FIGS. 9A-9D illustrate tile configurations 68A, 68B, 68C and 68D, respectively, for formation into rings to be fitted between various sections. These tiles include various arms and removed portions for overhanging the end ridge of a bellows section or for providing space to accommodate a welding bead. Through the use of bellows section rings 48, limiter rings 66 and other rings formed by tiles 68A-68D, substantially the entire inner surface of the liner wall 28 can be covered with a plasma limiter. The carbon limiter material is in intimate contact with the liner wall to preclude arcing. However the carbon limiter does not appreciably reduce the loop resistance of the vacuum liner 22. Even if adjacent rings touch, the carbon joint formed is of high resistance.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A vacuum liner for containing plasma in a high energy plasma device, said liner comprising:
   a vacuum tight liner wall made up by a series of sections, each section having a closed peripheral wall defining an interior with open ends, with adjacent interiors of adjacent sections forming a plasma path, said sections being bellows-shaped and having a plurality of corrugations extending transversely to the axis of said plasma path; and
   means for limiting the plasma for said liner wall and comprising a ring formed by beads nested in the interior groove formed by each of said corrugations, said beads extending from their grooves inwardly past the interior ridges flanking them, the material from which said beads are formed having a higher melting temperature than that of the material from which said sections are formed.

2. A vacuum liner as set forth in claim 1 wherein said liner wall defines a torus.

3. A vacuum liner as set forth in claim 1 wherein each bead has an aperture therethrough and each ring further comprises fastening means extending through the apertures of the beads forming said ring.

4. A vacuum liner as set forth in claim 1 wherein said liner wall is formed of steel.

5. A vacuum liner as set forth in claim 1 wherein said beads are formed of carbon.

6. A vacuum liner as set forth in claim 1 wherein certain of said beads have a stem received by a groove and an arm extending outwardly over an interior ridge partially defining said groove.

7. A vacuum liner as set forth in claim 6 wherein said arm overlaps a bead disposed in an adjacent groove.

8. A vacuum liner as set forth in claim 6 wherein certain beads having oppositely extending arms, each arm overlapping a bead in a respective adjacent groove.

9. A vacuum liner as set forth in claim 8 wherein said bead in an adjacent row is formed as a split cylinder having a flat surface facing the plasma.

10. A vacuum liner as set forth in claim 3 wherein said fastening means is a piece of resilient wire having a length greater than the circumference of its ring so that the ends of said piece both are disposed in the apertures of adjacent beads.

11. A vacuum liner as set forth in claim 10 wherein all beads in a ring are held in compression and wherein each bead has a tail portion with a concavity and further has a nose portion sized for reception in the concavity of the next bead, whereby all portions of said wire are shaded from said plasma.

12. A vacuum liner as set forth in claim 1 wherein said bellows-shaped sections are first sections and wherein said liner wall also includes second sections each having a peripheral wall defining an interior with open ends, the interiors of said second sections also forming parts of said plasma path, said second sections having generally smooth inner surfaces.

13. A vacuum liner as set forth in claim 12 wherein said means for limiting movement of the plasma further comprises a ring formed by tiles substantially covering the inner surface of each second section.

* * * * *